Reissued July 19, 1927. Re. 16,682

UNITED STATES PATENT OFFICE.

RAYMOND MARK WARNER, OF AKRON, OHIO, ASSIGNOR TO THE MILLER RUBBER COMPANY, OF AKRON, OHIO, A CORPORATION OF OHIO.

METHOD OF VULCANIZING RUBBER.

No Drawing. Original No. 1,540,580, dated June 2, 1925, Serial No. 721,076, filed June 19, 1924. Application for reissue filed May 31, 1927. Serial No. 195,576.

My present invention relates to vulcanization of rubber goods and more particularly to the use of certain compounding ingredients to prevent vulcanization of certain parts thereof.

There are several classes of rubber goods in which it is desirable to produce one part of an article of vulcanized rubber and another portion of the same article of unvulcanized rubber. A notable example is in the manufacture of inner tube patching material where it is desirable to build such material of two plies, one of which is vulcanized while the other is completely unvulcanized. For economic reasons it is desirable that the two compounds be united before being subjected to vulcanization and this insures a better bond between the two plies.

Where it is desired that a rubber compound should vulcanize it is usual to mix therewith sulphur or some sulphur containing ingredient. Sulphur and rubber alone would require an extremely long time to vulcanize and, as sulphur is of migratory properties, during such slow vulcanization sulphur would migrate throughout not only the stock in which it has been originally placed, but throughout the stock adjacent thereto in which sulphur had purposely been omitted. It is, therefore, evident that at least partial vulcanization of the entire mass would occur and would defeat the attempt to secure an article, part of which was unvulcanized. In the past in order to prevent such a result, it has been found necessary to heavily compound the stock which was to be vulcanized, and subjecting the articles to a high vulcanization temperature in attempts to substantially vulcanize the one stock before the other stock could attain appreciable vulcanization. Such attempts were not commercially reliable and the heavy compounding usually resulted in an inferior article.

The above process was improved upon by Morton and Harrison (U. S. Patent No. 1,478,576) who found that by the use of non-migratory accelerators the temperature required for vulcanization could be lowered to a point where vulcanization of compounds not containing such accelerators was impossible and that at such temperatures the sulphur would migrate to the accelerator-containing layer and would result in vulcanization of that layer only.

I find that in same cases it is desirable to obtain certain characteristics in the vulcanized rubber which are more easily obtained by the use of accelerators not suited to the Harrison and Morton process, due to their migratory nature.

In the search for a method of using migratory accelerators in situations similar to that described above, I have discovered a new class of compounding ingredients which from their nature I choose to call vulcanization retarding agents. These materials when added to compounds of rubber have a retarding action on vulcanization, and, therefore, produce an action opposite to that produced by accelerators. When added in sufficient quantities they prevent vulcanization completely.

Although my invention is applicable to the manufacture of various rubber articles and I do not care to confine my invention to any one article, as a matter of example I could say that inner tube patching material may be produced having one ply unvulcanized and the other ply completely vulcanized. In manufacturing such an article the parts or plies which it is desired to remain unvulcanized are compounded from rubber, sulphur, and vulcanization retarding material, whereas those parts or plies which are to become vulcanized are compounded from rubber, an accelerator and zinc oxide or other zinc salts. No sulphur is placed in the last named stock. The two compounds are calendered as two plies which are afterward superimposed and subjected to vulcanizing heat. Sulphur from the sulphur-containing stock migrates to the stock containing accelerator and zinc causing vulcanization of the last named stock at low temperature. Accelerator may migrate to the sulphur-containing stock, but in the presence of the retarding agent no vulcanization will occur.

As a specific example of such stocks I prepare two batches according to the following formulæ:

*Batch 1.*

| | Parts. |
|---|---|
| Pale crepe rubber | 50 |
| Sulphur | 2 |
| Whiting | 47 |
| Stannous chloride | 1 |
| | 100 |

*Batch 2.*

| | Parts. |
|---|---|
| Pale crepe rubber | 65 |
| Dimethyl-ammonium-dimethyl-dithiocarbamate | 1 |
| Zinc oxide | 2 |
| Whiting | 32 |
| | 100 |

Batch 1 I calender to a thickness of 1/64″, and Batch 2 to a thickness of 1/32″. The two plies are super-imposed and placed in a heated oven for 20 hours at 180° F., when it will be found that the ply made from Batch 1 will be unvulcanized, whereas the ply made from Batch 2 will be completely vulcanized. In the above example the dimethyl-ammonium-dimethyl-dithiocarbamate is the accelerator and stannous chloride is the retarding agent. The whiting is not necessary to the results, but is used as a filling ingredient. Of course other filling or coloring ingredients may be used, as will be understood by those skilled in the art. Also other migratory accelerators may be used in place of the one stated.

I have found stannous chloride to be an excellent retarding agent, but other chemicals have been found to perform in the same manner. I have secured similar results with oxalic acid, potassium tetra-oxalate, citric acid, salicylic acid, tartaric acid, boric acid and succinic acid.

It will be understood that the retarder used is of a non-migratory nature.

In its broad aspect, my invention involves the discovery that by the use of one of a class of agents I have called vulcanization retarders, vulcanization can be prevented in a portion of a sheet or article so compounded and treated according to known procedure for effecting vulcanization that portions contiguous the first named portion will be vulcanized.

Having thus described my invention, what I claim is:

1. The hereindescribed method of producing an article of rubber having one part vulcanized and another part unvulcanized, which consists in mixing two separate stocks, one containing rubber, sulphur and a vulcanization retarder, and the other rubber but no sulphur, juxtaposing said stocks, and subjecting the same to vulcanizing temperature.

2. The hereindescribed method of producing an article of rubber having one part vulcanized and another part unvulcanized, which consists in mixing two separate stocks, one containing rubber, sulphur and a vulcanization retarder, and the other rubber, an accelerator and a zinc salt but no sulphur, juxtaposing said stocks, and subjecting the same to vulcanizing temperature.

3. The hereindescribed method of producing an article of rubber having ane part vulcanized and another part unvulcanized, which consists in mixing two separate stocks, one containing rubber, sulphur and a vulcanization retarder, and the other rubber, a migratory accelerator and a zinc salt, but no sulphur, juxtaposing said stocks, and subjecting the same to vulcanizing temperature.

4. The hereindescribed method of producing a sheet of rubber comprising two layers one of which is vulcanized and the other unvulcanized, which consists in compounding two stocks, one containing rubber, sulphur and a vulcanization retarder, and the other rubber but no sulphur, forming said stocks into sheets, superimposing said sheets one on the other, and subjecting the same to a vulcanizing temperature.

5. The hereindescribed method of producing a sheet of rubber comprising two layers one of which is vulcanized and the other unvulcanized, which consists in compounding two stocks, one containing rubber, sulphur and a vulcanization retarder, and the other rubber, an accelerator and a zinc salt, but no sulphur, forming said stocks into sheets, superimposing said sheets one on the other, and subjecting the same to a vulcanizing temperautre.

6. The hereindescribed method of making an article having one part of vulcanized rubber and another part of unvulcanized rubber, which consists in mixing two separate stocks one containing rubber, sulphur and a vulcanization retarder, and the other rubber but no suluhur, juxtaposing said stocks in shape to form the desired article, and subjecting to curing temperature.

7. The hereindescribed method of making an article having one part of vulcanized rubber and another part of unvulcanized rubber, which consists in mixing two separate stocks one containing rubber, sulphur and a vulcanization retarder, and the other rubber, an accelerator and a zinc salt but no sulphur, juxtaposing said stocks in shape to form the desired article, and subjecting to curing temperature.

8. The hereindescribed method of treating rubber which consists in incorporating in a sulphur-containing portion thereof a vulcanization retarder and then subjecting the article to heat.

9. The method of treating rubber which consists in vulcanizing the rubber in the presence of stannous chloride acting as a retarder.

10. Masses and articles containing rubber, the vulcanization of which is retarded by the presence of stannous chloride.

11. As an article of manufacture, a rubber patch material consisting of a vulcanized ply and a superimposed unvulcanized ply, united to each other by vulcanization, the vulcanization of the vulcanized part of the patch having been obtained by the use of sulphur as a vulcanizing agent, and the unvulcanized portion having been obtained by the use therein of a vulcanization retarder.

12. A sheet or article formed from a rubber compound having one part in a substantially different condition as to state of vulcanization from another part, such different conditions being effected by the use of a vulcanization retarder.

13. The method relating to the manufacture of multi-ply patching rubber which consists in introducing into one of the plies, prior to subjecting said rubber to a vulcanization temperature, a substance which acts to retard vulcanization.

14. Masses and articles formed from a rubber compound having the vulcanization of portions thereof retarded by the presence of a vulcanization retarding agent, substantially as described.

15. An article formed by subjecting a rubber compound to vulcanization, said article having a part unvulcanized due to the presence of a vulcanization retarder, substantially as described.

16. The method of producing by vulcanization an article from a mass including rubber and compounding ingredients and in which sulphur is employed as a vulcanizing agent, involving the step of introducing into a part of the mass an ingredient having the property of retarding vulcanization.

17. The method of producing a sheet or article formed from a rubber mass for obtaining different conditions as to state of vulcanization in different parts thereof, involving the treatment of one part of the mass by a normally migratory agent having the property of effecting vulcanization, and the step of introducing into another part of the mass an agent having the property of retarding vulcanization.

18. A method relating to the manufacture of rubber articles having a part vulcanized and a part unvulcanized, which consists in introducing into the compound not later than the subjection of the article to a vulcanizing temperature, an agent for causing vulcanization and an agent having the property of accelerating vulcanization, and also introducing into the portion of the compound which is to remain unvulcanized an ingredient having the property of retarding vulcanization.

19. In the manufacture of an article having a part vulcanized and a part unvulcanized, a stock comprising rubber and compounding ingredients including sulphur and an agent having the property of retarding vulcanization localized in the stock.

20. The method of retarding vulcanization at a localized part of a normally vulcanizable stock consisting in introducing into said part an agent having the property of retarding vulcanization.

In testimony whereof I affix my signature.

RAYMOND MARK WARNER.